UNITED STATES PATENT OFFICE.

BETSEY C. HOBSON, OF PORTLAND, MAINE.

IMPROVEMENT IN MEDICAL COMPOUNDS FOR BILIOUS DISEASES.

Specification forming part of Letters Patent No. 153,957, dated August 11, 1874; application filed July 20, 1874.

*To all whom it may concern:*

Be it known that I, BETSEY C. HOBSON, of Portland, in the county of Cumberland and State of Maine, have invented certain new and useful Improvements in Medical Compounds for Bilious Complaints; and I do hereby declare that the following is a full, clear, and exact description thereof, which will enable others skilled in the art to which it pertains to make and use the same.

My invention consists in a certain compound of various ingredients, which, when combined, constitute a medicine for the cure of bilious complaints.

My medicine is composed of saleratus, Jamaica ginger, turmeric, water, rum, molasses, and gum-aloes. These ingredients are first to be mixed, and then allowed to remain a sufficient time to become thoroughly incorporated with each other.

The following formula is given for the preparation of about one pint of the medicine, viz:

One-half pint water, one-half pint new rum, one teaspoonful saleratus, one-half teaspoonful Jamaica ginger, one-fourth ounce turmeric, one table-spoonful molasses, three-fourths ounce gum-aloes.

Precise conformity to the proportions above given is not necessary so long as the same may be substantially complied with in order to give the desired bitter, tonic, and cathartic quality to the medicine.

What I claim as my invention, and desire to secure by Letters Patent, is—

The medical compound as described, and composed of the ingredients substantially in the proportions set forth.

In testimony that I claim the foregoing as my own I affix my signature in presence of two witnesses.

BETSEY C. HOBSON.

Witnesses:
WM. HENRY CLIFFORD,
H. N. HOBSON.